No. 717,343. Patented Dec. 30, 1902.
J. CARLEN.
EGG TESTER.
(Application filed May 26, 1902.)
(No Model.) 2 Sheets—Sheet 2.
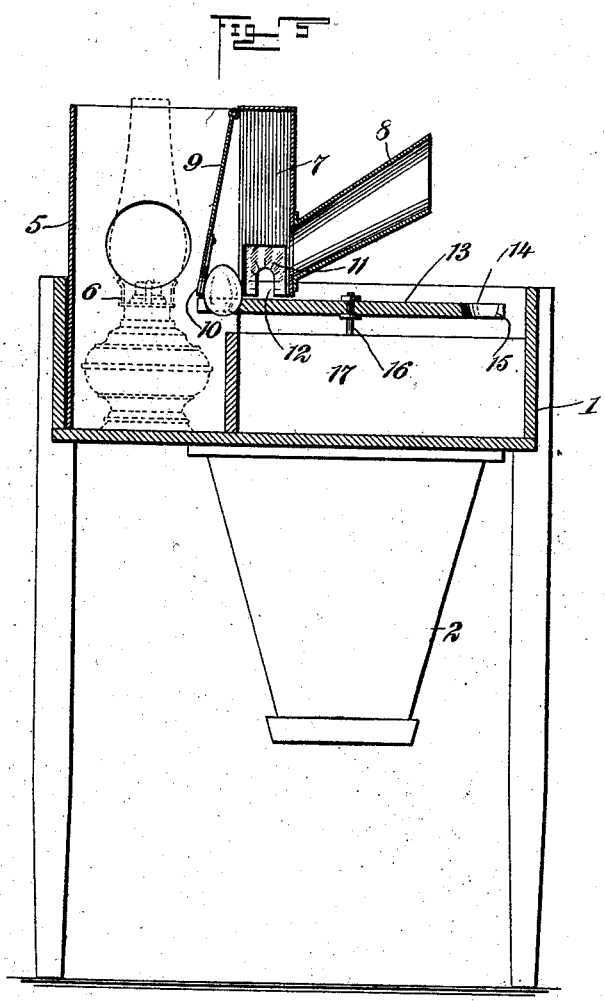
WITNESSES:
INVENTOR
John Carlen
BY
ATTORNEYS.

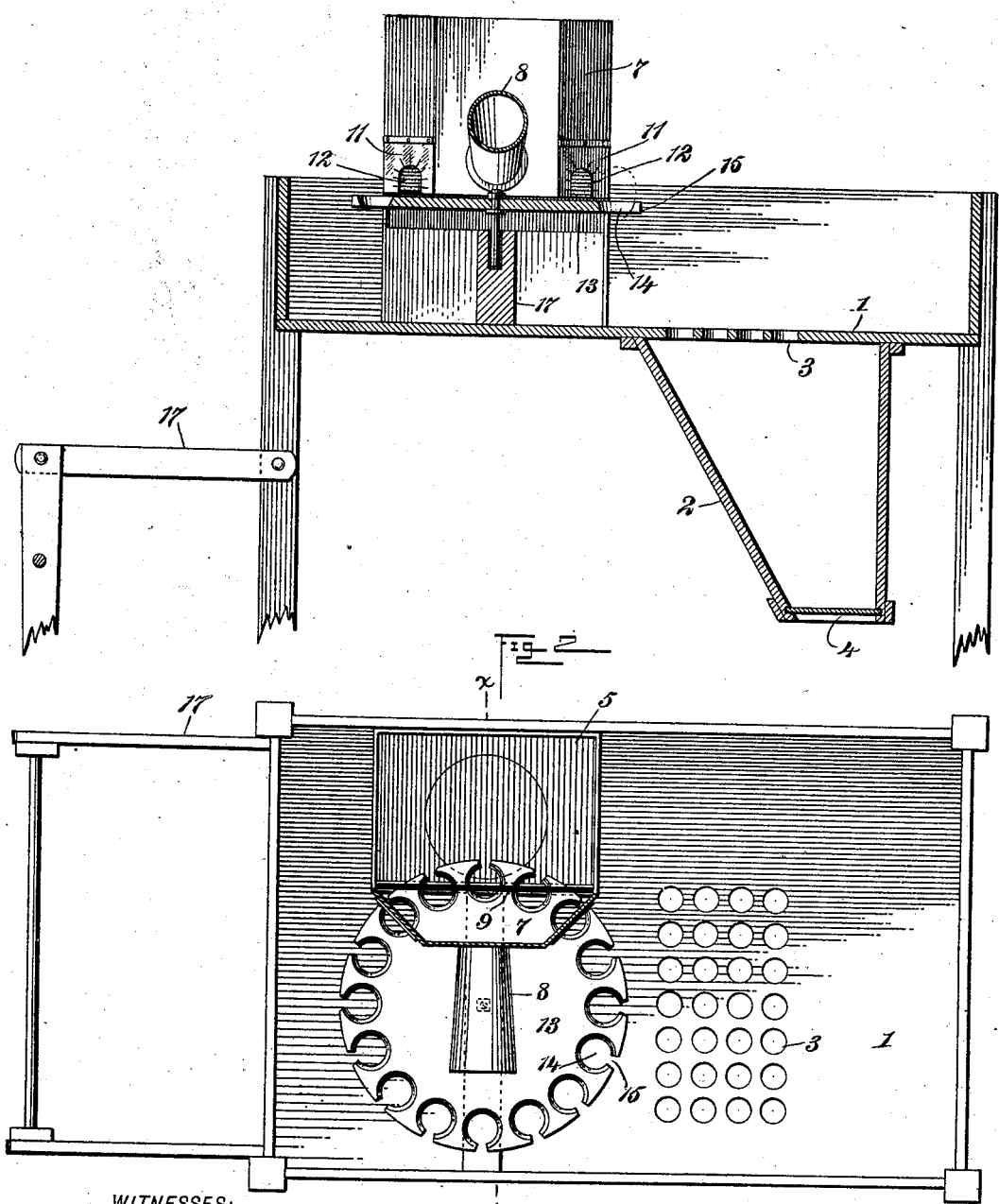

UNITED STATES PATENT OFFICE.

JOHN CARLEN, OF HAVANA, NORTH DAKOTA, ASSIGNOR OF ONE-HALF TO HARRY B. JESSUP, OF HAVANA, NORTH DAKOTA.

EGG-TESTER.

SPECIFICATION forming part of Letters Patent No. 717,343, dated December 30, 1902.

Application filed May 26, 1902. Serial No. 108,947. (No model.)

*To all whom it may concern:*

Be it known that I, JOHN CARLEN, a citizen of the United States, and a resident of Havana, in the county of Sargent and State of North Dakota, have invented a new and Improved Egg-Tester, of which the following is a full, clear, and exact description.

This invention relates to improvements in machines for testing eggs, the object being to provide a device of this character of simple construction and by means of which eggs may be rapidly and accurately tested.

I will describe an egg-tester embodying my invention and then point out the novel features in the appended claims.

Reference is to be had to the accompanying drawings, forming a part of this specification, in which similar characters of reference indicate corresponding parts in all the figures.

Figure 1 is a sectional elevation of an egg-tester embodying my invention. Fig. 2 is a plan view thereof with the top of the dark chamber removed to more clearly show other parts, and Fig. 3 is a section on the line $x\,x$ of Fig. 2.

Referring to the drawings, 1 designates a tray into which the packed eggs are designed to be placed, and arranged underneath the tray is a hopper 2 for receiving the bran, oats, or the like in which the eggs are packed, the same passing through openings 3, formed in the bottom of the tray. It is to be understood, however, that instead of forming the openings 3 directly through the wooden bottom of the tray a bottom of wire-netting or the like may be placed over the hopper. The lower end of the hopper is provided with a sliding closure 4, which may be opened to discharge the packing material.

Arranged in one side of the tray is a casing 5, in which a lamp 6 is designed to be placed. This casing is provided with openings at opposite sides for the purpose both of ventilation and of permitting access to regulate the lamp.

At the inner side of the casing 5 is a dark chamber 7, into the lower portion of which a sight-tube 8 leads. The wall 9 between the dark chamber and the casing 5 is hinged to the upper portion of the dark chamber, so that it may swing outward to permit the eggs to pass. At the lower portion this swinging wall 9 has an opening 10, through which light may pass to the egg directly in front of it. The side walls of the dark chamber 7 at the bottom are provided with openings, and over these openings are secured curtains 11, of flexible material—such, for instance, as rubber—and each curtain is provided with an opening 12, which will be substantially the size of a small egg; but to permit large eggs to pass through the same readily the flexible material 11 is slitted from the walls of the opening 12 outward, as clearly indicated in the drawings.

Mounted to rotate in the tray is an egg-carrier consisting of a disk 13, having around its edge a series of openings 14, in which eggs are designed to be placed, and from each opening 14 there is an outward opening 15, which permits the light to strike upon all portions of the egg in line with the opening 10. This carrier 13 projects underneath the dark chamber 7 and somewhat into the casing 5, as clearly shown in Figs. 2 and 3. The carrier 13 is mounted on a spindle 16, which has a bearing in a cross-bar 17, arranged in the tray.

At one end of the machine I provide a folding frame 17, upon which the egg-cases may be placed to receive the tested eggs. The upper portions of this frame 17 are pivoted to the legs supporting the tray.

In operation the eggs to be tested are placed in the openings 14 and the carrier 13 slowly rotated to bring the eggs successively in front of the opening 10, so that the same may be observed through the sight-tube 8. The openings 14 are so spaced that the openings 12 of the curtains 11 will be closed by eggs while an egg is in line with the opening 10, thus excluding all light.

Having thus described my invention, I claim as new and desire to secure by Letters Patent—

1. An egg-tester comprising a tray, a casing therein adapted to receive a lamp, a dark chamber at one side of the casing, a sight-tube leading into said dark chamber, a swinging wall between the dark chamber and casing, the said swinging wall having an opening at its lower edge, and means for carrying eggs through the dark chamber, substantially as specified.

2. An egg-tester comprising a tray, a casing therein adapted to receive a lamp, a dark chamber inward of the casing, a swinging wall between the dark chamber and casing, the said swinging wall having an opening at its lower portion, a sight-tube leading into the dark chamber and in line with said opening, flexible curtains at the sides of the dark chamber and having openings for the passage of eggs, and a carrier consisting of a disk having openings to receive eggs, said carrier being mounted to rotate, substantially as specified.

3. An egg-tester comprising a tray, a casing arranged in the tray and adapted to receive a lamp, a dark chamber at one side of the casing, a swinging wall between the dark chamber and casing, the said swinging wall having an opening at the bottom, a sight-tube leading into the dark chamber, curtains arranged over openings in the side walls of the dark chamber, the said curtains having openings for the passage of eggs and the material of the curtains being slitted outward from said openings, and a rotary carrier for moving eggs through the dark chamber, substantially as specified.

4. An egg-tester comprising a tray, a casing arranged in the tray and adapted to receive a lamp, a dark chamber arranged at one side of the casing, a swinging wall between the dark chamber and casing, the said swinging wall having an opening at the bottom, a sight-tube leading into the dark chamber in line with said opening, curtains over openings in the side walls of the dark chamber, the said curtains being provided with openings, and a carrier consisting of a rotary disk having openings to receive eggs and openings outward from the first-named openings, substantially as specified.

5. An egg-tester comprising a tray, a dark chamber arranged in the tray, a sight-tube leading into the dark chamber, a receptacle for a light-giving device, a swinging wall between the dark chamber and said receptacle, the said wall being provided with an opening at the bottom, the side walls of the dark chamber being provided with openings, curtains of flexible material over said openings and provided with openings, a carrier consisting of a disk mounted to rotate and having a portion extended into said dark chamber and also into the receptacle, and a hopper arranged underneath the tray, the said tray having openings in its bottom wall over said hopper, substantially as specified.

In testimony whereof I have signed my name to this specification in the presence of two subscribing witnesses.

JOHN CARLEN.

Witnesses:
 WILLIAM C. MURPHY,
 S. E. ELLINGSON.